Dec. 11, 1945.　　　　　F. BELDI　　　　　2,390,683
DEMOUNTABLE HIGH-VACUUM HOT-CATHODE RECTIFIER
Filed April 24, 1943
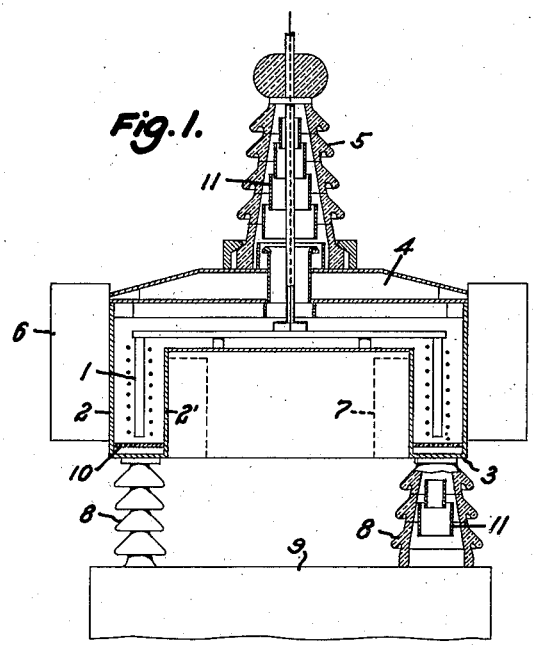
Fig. 1.
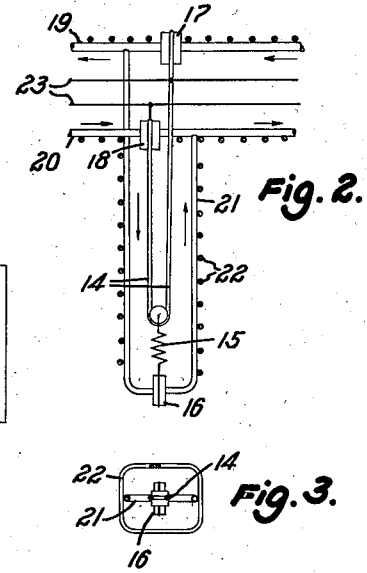
Fig. 2.
Fig. 3.
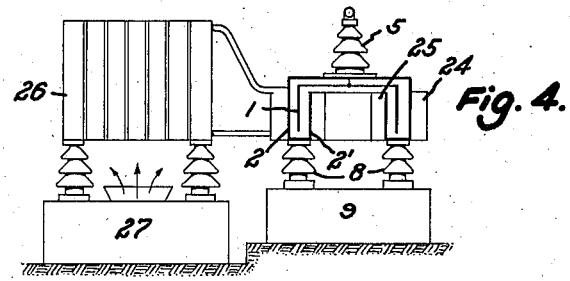
Fig. 4.
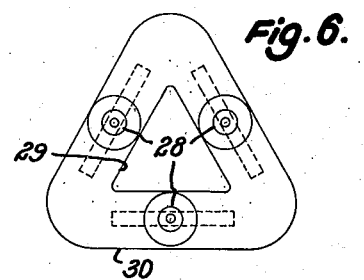
Fig. 6.
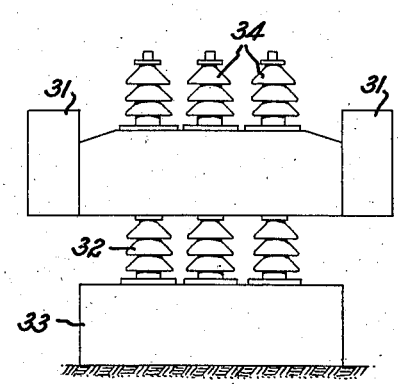
Fig. 5.
Inventor:
Fritz Beldi,
By Pierce & Scheffler,
Attorneys.

Patented Dec. 11, 1945

2,390,683

UNITED STATES PATENT OFFICE 2,390,683

DEMOUNTABLE HIGH-VACUUM HOT-CATHODE RECTIFIER

Fritz Beldi, Baden, Switzerland, assignor to Aktiengesellschaft Brown, Boveri & Cie., Baden, Switzerland Application April 24, 1943, Serial No. 484,456
In Switzerland February 14, 1942

16 Claims. (Cl. 250—27.5)

In order to increase the output of high vacuum hot cathode rectifiers and at the same time keep their dimensions within reasonable and permissible limits, it is necessary to increase the anode load. The higher current density which thus results and the corresponding rise in operating temperature which occurs necessitates on the one hand a more intensive cooling of the rectifier and on the other hand a demountable type of rectifier. Joints which are not capable of withstanding high temperatures must therefore be arranged to be beyond the effective range of the high anode and cathode temperatures and it is also very important that the insulation between the anodes and the cathode, including the control grids, is not subjected to too high a temperature. Furthermore care must also be taken that in the case of disturbances where high short-circuit currents and correspondingly strong arc discharges may occur, the discharge does not spread to the joints and insulators.

These aforementioned conditions for increasing the power of a hot cathode high vacuum rectifier can be complied with in a very simple manner when according to the invention the cathode of the rectifier is surrounded by a double ring-shaped anode which at the same time can form the walls of the rectifier vessel. By this means the cathode is completely surrounded by metal and the insulators lie beyond the range of action of the cathode. The cathode together with the control grid is suspended from the bushing insulator, so that there is no leakage insulation between cathode and anode. It is also possible to locate cooling pockets in the immediate vicinity of the anode so that a very intensive and effective cooling can be obtained and the desired increase in anode power achieved.

The objects and advantages of the invention will be apparent from the following specification when taken with the accompanying drawing in which:

Fig. 1 illustrates in diagrammatic form a longitudinal section through a high vacuum rectifier;

Figs. 2 and 3 show details of the hot cathode to an enlarged scale in longitudinal and cross section respectively;

Fig. 4 shows the assembly of the rectifier together with a cooling battery;

Figs. 5 and 6 show in elevation and plan a modified form of the invention for three-phase operation.

In Fig. 1 the cathode rods which are provided with a control grid are designated by the reference numeral 1, these rods being equally spaced between the walls 2, 2' of the double ring-shaped anode. These walls 2, 2' at the same time form the cylindrical walls of the rectifier vessel which is closed at its lower end by the annular plate 3 and at the upper end by the cover 4 in a vacuum-tight manner. A high-voltage bushing insulator 5 is provided in the cover 4 for supplying the current to the cathode 1 which is suspended from this insulator. Cooling pockets or ribs 6 are arranged on the outer wall 2 of the anode and if necessary cooling ribs or pockets 7 which have to be subjected to a stream of cooling air can also be provided on the inner wall 2'. The entire rectifier is mounted by means of supporting insulators 8 on the vacuum pump set 9, whereby part of the insulators 8, as shown in the right half of the figure, are constructed as hollow insulators for the evacuation of the rectifier. In order to protect the supporting insulators 8 from the effects of high temperatures it is expedient to arrange baffles 10 above the bottom plate 3 at the points where this plate is in contact with the insulators, these baffles being artificially cooled if necessary. The bushing insulator 5 and the supporting insulators 8 can be provided with control electrodes 11 which serve in a known manner to control the voltage gradient.

By suitably fixing the distance between the cathode 1 and the outer and inner anode wall 2 and 2' respectively, it is thus possible to arrange for the anode loading to correspond to the cooling conditions. Furthermore the usual bushing insulators for the anodes are no longer necessary because the anode also serves as the rectifier vessel. This results in a considerable reduction in the number of joints required and the few joints which are necessary are so located that they are not exposed to any high temperatures.

The cathode of the rectifier consists of a number of incandescent elements distributed equally around a circle. One of these elements together with the grid and the cooling system is shown in longitudinal section and cross-section in Figs. 2 and 3 respectively. The hot wires 14 of the cathode are fixed at their lower end to the insulator 16 by means of a tension device 15 and suspended separately at the upper ends from the insulators 17 and 18. The insulators for the incandescent elements are cooled by means of two ring-shaped cooling pipes 19 and 20 respectively, running along the entire circumference of the rectifier, the insulator 17 being fixed to the common inlet cooling pipe 19 and the insulator 18 to the common outlet cooling pipe 20. A separate branch pipe 21 is provided for cooling the lower insulator 16 of each cathode element, this branch pipe being connected on the one hand to the inlet pipe 19 and on the other hand to the outlet pipe 20. A control grid 22 is arranged on the outside of the cooling pipe 21. The currents leads 23 for the cathode wires 14 are located between the cooling pipes 19 and 20.

In cases where such a high rectifier output is required that natural air cooling is inadequate, effective cooling can be attained by employing an air-blast cooling system. A further possibility is to use a special cooling plant as shown in Fig. 4. The rectifier here has the same construction as that shown in Fig. 1 and each outer and inner wall 2 and 2' of the anode is surrounded by a cooling jacket 24 and 25 respectively, through which a continuous stream of cooling liquid flows, this cooling liquid being recooled in a cooling battery 26 provided with a fan 27.

Rectifiers constructed according to the present invention can be used very advantageously for three-phase operation, such a rectifier being shown in Figs. 5 and 6 in elevation and plan respectively. The three cathodes 28 can in this case be arranged to form a triangle inside a common vessel which is formed by the double walls 29, 30 of a common anode. The outer wall 30 of the rectifier vessel is provided with cooling pockets 31 and is mounted on the pump casing 33 by means of the supporting insulators 32. The reference numeral 34 indicates the bushing insulators for the cathodes 28 and as in the case of the single-phase type these insulators also serve for the suspension and fixing of the cathodes together with the associated grids.

I claim:

1. Demountable high-vacuum hot-cathode rectifier of the type including a rectifier vessel, a cover extending over the top of the vessel in vacuum-tight manner, a connection from the vessel to a vacuum pump, and a hot cathode and a grid within the vessel cooperating with an anode, characterised by the feature that the cathode of the rectifier is surrounded by a double ring-shaped anode and is supported by fluid cooled insulators within the confines of said anode.

2. Rectifier as in claim 1, characterised by the feature that the anode also forms the walls of the rectifier vessel.

3. Rectifier as in claim 1, characterised by the feature that the bushing insulator for the cathode is mounted on the cover of said vessel and serves as a supporting insulator for said cathode and for its associated grid.

4. Rectifier as in claim 1, characterised by the feature that the demountable joints for the rectifier are located beyond the effective range of the anode and cathode temperatures.

5. Rectifier as in claim 1, characterised by the feature that the rectifier vessel is supported upon said vacuum pump by a plurality of insulators, at least one of the supporting insulators for the rectifier vessel is hollow to provide said connection from the vessel to the vacuum pump.

6. Rectifier as in claim 1, characterised by the feature that the outer ring-shaped anode is the outer wall of the rectifier vessel and provided with cooling ribs or pockets.

7. Rectifier as in claim 1, characterised by the feature that the inner ring-shaped anode is the inner wall of the rectifier vessel and provided with cooling ribs or pockets.

8. Rectifier as in claim 1, characterised by the feature that the cathode consists of a plurality of incandescent elements uniformly distributed around a circle, in combination with insulators supporting said cathode elements, and a common cooling system for cooling said cathode-supporting insulators.

9. Rectifier as in claim 1, in combination with a cooling system adjacent the cathode and including a cooling pipe serving as a support for the grid surrounding said cathode.

10. In a demountable high-vacuum hot-cathode rectifier, an all metal rectifier casing having inner and outer cylindrical walls defining an annular space, cathode and control grid elements within said annular space, the cylindrical walls constituting the anode of the rectifier, a vacuum pump, a plurality of insulators supporting said rectifier casing upon said vacuum pump, at least one of said supporting insulators being hollow to provide a connection between said rectifier casing and said vacuum pump, and baffles between said supporting insulators and said cathode elements.

11. In a demountable high-vacuum hot-cathode rectifier, the invention as recited in claim 10, wherein said supporting insulators are hollow, and control electrodes are located within said hollow insulators to establish a desired voltage gradient along said insulators.

12. In a high-vacuum hot-cathode rectifier, cathode elements adapted to be heated to incandescence, an anode, control grid elements, insulators supporting said cathode elements, and a cooling system including pipes on which said insulators are mounted, and cooling pipes located in the space between said cathode elements and said anode, said cooling pipes comprising at least a part of said control grid elements.

13. In a high-vacuum hot-cathode rectifier, the invention as recited in claim 12 wherein said cooling pipes are of U-form and located about the respective cathode elements.

14. In a high-vacuum hot-cathode rectifier, the invention as recited in claim 12 wherein said cooling pipes are of U-form and located about the respective cathode elements, and said grid elements include a winding on the outside of the several U-form cooling pipes.

15. A three-phase hot-cathode rectifier comprising a double-walled metallic rectifier vessel, the walls of the vessel constituting a common anode for the several phases, a cathode for each phase located between the double walls of the vessel, and a control grid for each cathode.

16. In a three-phase hot-cathode rectifier, the invention as recited in claim 15 wherein said double-walled metallic rectifier vessel is of triangular shape, one cathode and associated control grid being located in each side of the rectifier vessel.

FRITZ BELDI.